(12) United States Patent
Ichimura et al.

(10) Patent No.: US 7,301,875 B2
(45) Date of Patent: Nov. 27, 2007

(54) INFORMATION RECORDING DEVICE AND INFORMATION RECORDING METHOD

(75) Inventors: Isao Ichimura, Tokyo (JP); Tsutomu Maruyama, Chiba (JP); Yuichi Sabi, Tokyo (JP); Kiyoshi Osato, Chiba (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 10/890,176

(22) Filed: Jul. 14, 2004

(65) Prior Publication Data

US 2005/0036423 A1 Feb. 17, 2005

(30) Foreign Application Priority Data

Jul. 18, 2003 (JP) .............................. 2003-277127

(51) Int. Cl.
*G11B 7/00* (2006.01)

(52) U.S. Cl. ................................. 369/59.11; 369/59.12

(58) Field of Classification Search ............. 369/59.11, 369/59.12
See application file for complete search history.

(56) References Cited

U.S. PATENT DOCUMENTS

| | | | |
|---|---|---|---|
| 5,732,062 A | 3/1998 | Yokoi et al. | |
| 5,745,467 A | 4/1998 | Sakaue et al. | |
| 6,411,579 B2 | 12/2001 | Nobukuni et al. | |
| 6,459,666 B1 * | 10/2002 | Yokoi ....................... | 369/47.15 |
| 6,721,255 B1 * | 4/2004 | Gushima et al. ......... | 369/59.12 |
| 7,075,871 B2 * | 7/2006 | Kato et al. ............... | 369/47.53 |
| 7,079,466 B1 * | 7/2006 | Jacobs ...................... | 369/59.12 |
| 7,082,090 B2 * | 7/2006 | Kato et al. ............... | 369/59.11 |
| 7,158,461 B1 * | 1/2007 | Seo et al. ................. | 369/59.12 |
| 2002/0080703 A1* | 6/2002 | Furukawa et al. ....... | 369/59.11 |
| 2003/0039192 A1* | 2/2003 | Miyamoto et al. ....... | 369/59.11 |
| 2005/0041552 A1* | 2/2005 | Shoji et al. .............. | 369/59.12 |
| 2006/0245328 A1* | 11/2006 | Ahn et al. ................ | 369/59.11 |

(Continued)

FOREIGN PATENT DOCUMENTS

EP          1 260 973 A2          11/2002

(Continued)

*Primary Examiner*—Wayne Young
*Assistant Examiner*—Linh T. Nguyen
(74) *Attorney, Agent, or Firm*—Oblon, Spivak, McClelland, Maier & Neustadt, P.C.

(57) ABSTRACT

An optimum performance is achieved relative to write-once type optical recording mediums on which information is recorded by means of a blue-violet semiconductor laser. An optical disc recording/reproduction apparatus 10 comprises an LD control section 17 adapted to control the irradiation power of a laser when writing data. If the cycle of the channel clock is T, when forming a recording mark having a length of n×T (n being an integer not smaller than 2), a pulse beam is irradiated onto the write-once type information recording medium for n/2 times (decimals, if any, being to be rounded down). When forming a recording mark having a length of not smaller than 6T and even number times of T, a pulse beam is irradiated for n/2 times with all the intermediate pulse beams synchronized with the phase of the channel clock except the leading pulse beam and the tail end pulse beam. When forming a recording mark having a length of not smaller than 6T and odd number times of T, a pulse beam is irradiated with all the intermediate pulse beams delayed from the phase of the channel clock by T/2 except the leading pulse beam and the tail end pulse beam.

10 Claims, 15 Drawing Sheets

U.S. PATENT DOCUMENTS

2006/0256689 A1* 11/2006 Kato .................. 369/59.11
2006/0285477 A1* 12/2006 Shoji et al. ............. 369/275.4

FOREIGN PATENT DOCUMENTS

| | | |
|---|---|---|
| EP | 1 361 570 A2 | 11/2003 |
| JP | 2002-264506 | 9/2002 |
| JP | 2003-085751 | 3/2003 |

* cited by examiner

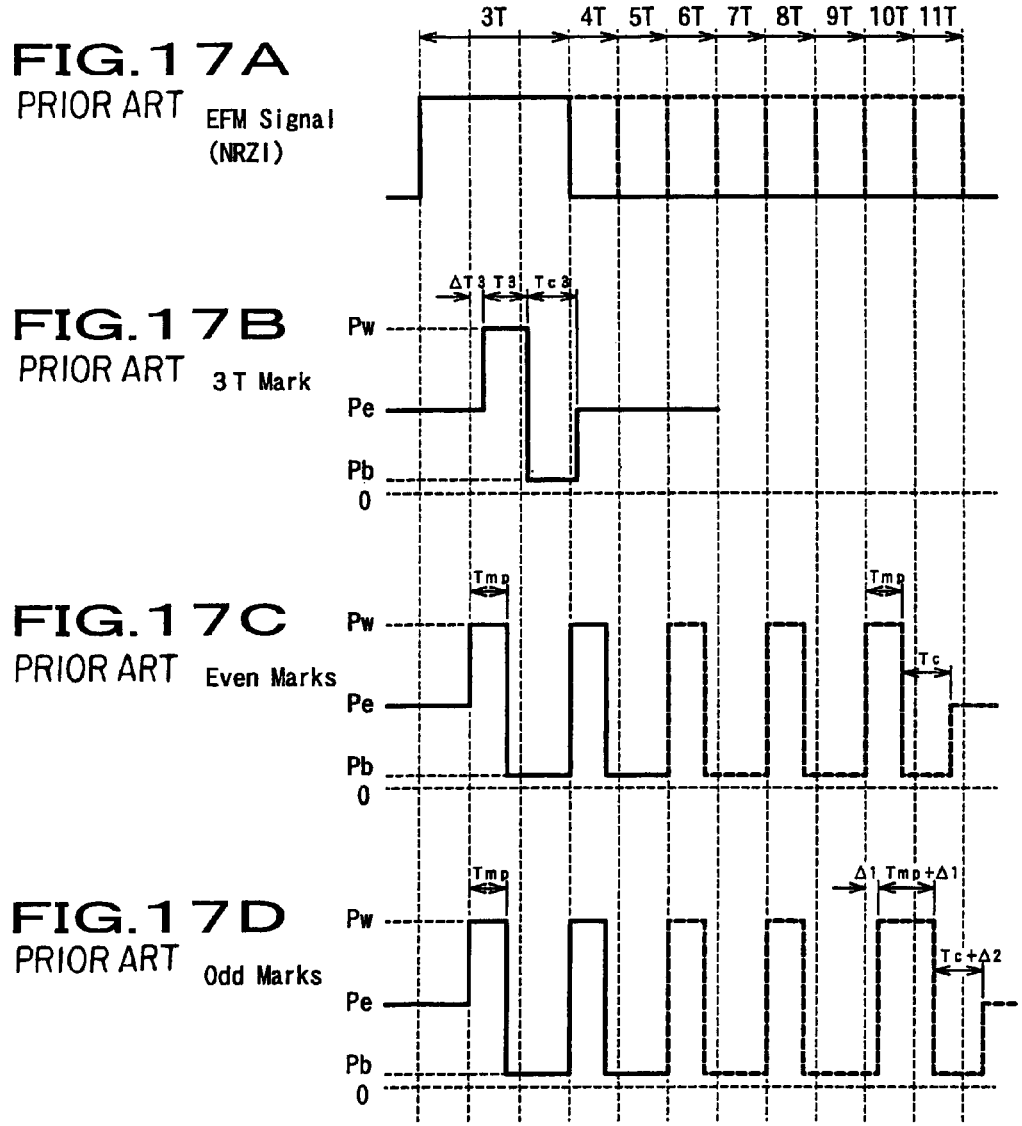

INFORMATION RECORDING DEVICE AND INFORMATION RECORDING METHOD

BACKGROUND OF THE INVENTION

1. Field of the Invention

This invention relates to an information recording device and an information recording method for recording information on a write-once type optical information recording medium by means of a laser beam.

2. Related Background Art

Optical information recording/reproduction devices typically including optical disc recording/reproduction devices are adapted to converge a laser beam onto the recording layer of a recording medium so as to write information to and read information from the recording layer. If the wavelength of the laser beam is λ and the numerical aperture of the objective lens is NA, the diameter (Φ) of the spot of converged light on the recording medium is generally expressed by formula (1) below.

$$\Phi = \lambda / NA \quad (1)$$

Therefore, the shorter the wavelength of the laser beam and the larger the numerical aperture of the objective lens, the small the diameter of the spot of converged light on the recording medium so that information can be recorded optically at high density. The numerical aperture of the objective lens is 0.45 in the case of CD (Compact Disc (tradename)) players and 0.6 to 0.65 in the case of DVD (Digital Versatile Disc (tradename)) players. The numerical aperture of the objective lens of recently developed BD (Blu-ray Disc (tradename)) recording/reproduction devices that use a blue-violet semiconductor laser (wavelength: 405 nm) is improved to be as large as 0.85.

Generally, two different control methods are provided for the purpose of controlling the power of irradiating a laser beam when writing data They are selectively used depending on the type of the receiving material. A laser beam is irradiated continuously to form a recording mark with one of the control methods for controlling the power of irradiating a laser beam. This method is mainly applied to write-once type recording mediums formed by using an organic coloring material. With this method, a pulse beam is irradiated for a single mark (a part of EFM signal where the signal is at HIGH) of an EFM (Eight-to-Fourteen Modulation) signal, as shown in FIG. 15. A pulse beam is irradiated once or for a plurality of times to form a recording mark (pulse irradiation method) with the other control method for controlling the power of irradiating a laser beam. This method is mainly applied to rewritable type recording mediums formed by using a phase change recording material. For example, a pulse beam is irradiated for a plurality of times for a single mark (a part of EFM signal where the signal is at HIGH) of an FEM signal as shown in FIG. 16.

In the case of a recording/reproduction device for CD-RWs that are recording mediums formed by using a phase change recording material, a system of irradiating a pulse beam for n−1 times or n−2 times in order to form a recording mark with a length of n×T as write strategy, in other words, a system defining a width of T/2 for the pulse beam (pulse irradiation system), is adopted. Note that an EFM (Eight-to-Fourteen Modulation) code is used as modulation code for CD-RWs and, in the above description, n represents an integer not smaller than 3 and not greater than 11, while T represents the cycle period of the clock (channel clock) of the binary signal (EFM signal) to be recorded.

As shown in FIG. 16, a write strategy of synchronizing the timing of emission of a pulse beam with the channel clock is adopted in recording/reproduction devices for CD-RWs to simplify the configuration of the pulse generation circuit for driving the semiconductor laser. Additionally, a write strategy of controlling the power of emitting a laser beam by way of three levels of a recording peak level (Pw), an erasing level (Pe) and a cooling level (Pb) for write operations so as to make it possible to record signals by overwriting by means of a single beam.

Meanwhile, in recording/reproduction devices for CD-RWs, the channel clock for the basic recording rate (1×1) is as low as 4.32 MHz and that the time length corresponding to the channel clock cycle period of (1×T) is about 230 ns. If a write strategy of defining a width of T/2 for the pulse beam to be irradiated is adopted as described above, the time length of the pulse beam to be irradiated is 115 ns. Then, an excellent recording/reproduction performance can be realized because this time length is sufficiently long for the rising time (tr) and the falling time (tf) (both tr and tf being normally 2 to 3 ns) of the waveform of a laser beam emitted from a semiconductor laser.

However, with the high speed recording rate (24 times) that is specified by the high speed recording specifications for CD-RWs and has been put to use in recent years, the channel clock is as high as about 104 MHz and the time length corresponding to the channel clock cycle period of (24×T) is about 10 ns. If a write strategy of defining a width of T/2 for the pulse beam to be irradiated is adopted as described above, the time length of the pulse beam to be irradiated is as short as about 5 ns. Then, it is difficult to drive the semiconductor laser to emit a pulse beam for such a short time length. In view of this problem, according to the high speed recording specifications for CD-RWs that defines a high speed recording rate of 24 times as high as the ordinary recording rate, a system of irradiating a single pulse to form a recording mark with a length of (2×T), or irradiating a pulse beam n/2 times or (n−1)/2 times to form a recording mark with a length of n×T (2T pulse recording system) is adopted as write strategy. Such a recording method is disclosed, inter alia, in Japanese Patent Application Laid-Open Publication Nos. 2002-288837 and 2002-237051.

FIG. 17A to FIG. 17D illustrates the 2T pulse recording system in detail. With the 2T pulse recording system, recording marks are classified into three categories of 3T mark (shortest mark) as shown in FIG. 17B, even mark (e.g., 8×T) as shown in FIG. 17C and odd mark (e.g., 9T) as shown in FIG. 17D depending on the pulse width of the write binary signal (EFM signal) as shown in FIG. 17A, to each of which a certain degree of freedom is allowed in terms of the position of the irradiated pulse beam and the pulse width when forming recording marks.

With the 2T pulse recording system, for instance, all the radiated pulses are synchronized with the phase of the channel clock for even marks as shown in FIG. 17C but, as shown in FIG. 17D, the values of the position of irradiation, the duration of irradiation and the cooling time after the pulse irradiation of the tail end pulse for odd marks are differentiated from those of the tail end pulse for even marks. This arrangement is devised to change the length of the recorded mark under the condition of a same number of times of pulse irradiation. Additionally, as for the category of 3T mark, a single irradiated pulse and the cooling time can be freely defined so as to synchronize it with other recording marks on the recording medium in terms of recording mark length and edge position.

Efforts have been paid in recent years to develop write-once type recording mediums that are compatible with the BD (Blu-ray Disc (tradename)) system that employs a blue-violet semiconductor laser (e.g., wavelength: 405 nm). Write-once type recording mediums contain an organic coloring material or a metal material in the recording layer thereof so that they allow irreversible recording (write-once recording).

To keep pace with the development of write-once type recording mediums, efforts are also being paid to develop optimum write strategies to be used for write-once type recording mediums adapted to the BD system. When a pulse irradiation system is adopted for a write strategy for write-once type recording mediums adapted to the BD system, it may be safe to assume that it is necessary to keep uniform pulse irradiation intervals for the purpose of achieving an optimum recording/reproduction performance.

While each of the above cited patent documents describes a method of applying the 2T pulse recording system, the patent documents are limited to the use of reversible phase change recording materials for recording mediums and, according to them, pulse irradiation intervals are not held uniform so that they may not feasibly be able to find practical applications. While the International Patent Application Laid-Open Publication No. WO03023771 proposes a similar pulse recording method, the proposed method is adapted to control the mark length mainly by the irradiated tail end pulse width so that an excellent recording/reproduction performance may not be achieved if the method is applied to write-once type recording mediums.

SUMMARY OF THE INVENTION

In view of the above identified circumstances, it is therefore the object of the present invention to provide an information recording device and an information recording method adapted to show an optimum performance relative to write-once type optical recording mediums on which information is recorded typically by means of a blue-violet semiconductor laser in order to dissolve the above listed problems.

In an aspect of the present invention, the above object is achieved by providing an information recording device for writing binary data on a write-once type information recording medium having a recording material that gives rise to an irreversible change to the light reflecting condition thereof when irradiated with light of not less than a predetermined power level by forming a continuous row of recording marks, which are parts where the light reflecting condition has changed, and spaces, which are parts where the light reflecting condition has not changed, the device comprising: a modulation section adapted to generate the binary data to be written onto the write-once type information recording medium by modulating the input information; a laser write section adapted to irradiate a laser beam onto the write-once type information recording medium, moving the position of the laser beam irradiation spot relative to the write-once type information recording medium: and a control section adapted to control the laser write section according to the binary data and forming a row of recording marks and spaces corresponding to the code string of the binary data.

In another aspect of the invention, there is provided an information recording method for writing binary data on a write-once type information recording medium having a recording material that gives rise to an irreversible change to the light reflecting condition thereof when irradiated with light of not less than a predetermined power level by forming a continuous row of recording marks, which are parts where the light reflecting condition has changed, and spaces, which are parts where the light reflecting condition has not changed, the method comprising: generating the binary data to be written onto the write-once type information recording medium by modulating the input information; and irradiating a laser beam onto the write-once type information recording medium, moving the position of the laser beam irradiation spot relative to the write-once type information recording medium, to form a row of recording marks and spaces corresponding to the code string of the binary data.

Preferably, in an information recording device and an information recording method according to the invention, if the channel clock cycle of the binary data is T, the input information is so modulated that the shortest identical code length of the binary data is not less than $2 \times T$.

Preferably, in an information recording device and an information recording method according to the invention, recording marks are formed by irradiating a pulse beam in a manner as defined below depending on the length of recording mark.

When forming a recording mark having a length of $n1 \times T$ ($n1$ being an integer not smaller than 2), a pulse beam is irradiated onto the write-once type information recording medium for $n1/2$ times (decimals, if any, being to be rounded down). When forming a recording mark having a length of not smaller than $n2 \times T$ ($n2$ being an even number not smaller than 6), a pulse beam is irradiated onto the write-once type information recording medium for $n2/2$ times with all the intermediate pulse beams synchronized with the phase of the channel clock except the leading pulse beam and the tail end pulse beam. When forming a recording mark having a length of not smaller than $n3 \times T$ ($n3$ being an odd number not smaller than 6), a pulse beam is irradiated onto the write-once type information recording medium for $(n3-1)/2$ times with all the intermediate pulse beams delayed from the phase of the channel clock by $T/2$ except the leading pulse beam and the tail end pulse beam.

Preferably, in an information recording device and an information recording method according to the invention, the emission time of the pulse beam, the cooling time after the emission, the position of the leading pulse beam and that of the tail end pulse beam are changed as a function of the length of the space immediately before and that of the space immediately after any recording mark.

As described above, an information recording device and an information recording method according to the invention are adapted to irradiate a pulse beam as described above as a function of the length of the recording mark to be formed. With this arrangement, the pulse irradiation intervals are kept uniform relative to a write-once type information recording medium having a recording material that gives rise to an irreversible change to the light reflecting condition thereof when irradiated with light of not less than a predetermined power level so as to provide an optimum recording/reproduction performance relative to a write-once type information recording medium.

Additionally, in an information recording device and an information recording method according to the invention, the timing and the duration of irradiation of a pulse beam and the cooling time after the irradiation of the pulse beam for forming any recording mark are changed as a function of the length of the space immediately before and that of the space immediately after the recording mark. With this arrangement, it is possible to accurately control the positions of the edges of each recording mark so that consequently the tolerance for displacement of pulse beam and errors in the length of the pulse beam is improved to allow the recording power level of the laser beam to be reduced.

BRIEF DESCRIPTION OF THE DRAWINGS

FIG. 17A to FIG. 17D are schematic illustrations of a write strategy for forming a recording mark with a length of (2×T) by continuously irradiating a pulse beam.

DETAILED DESCRIPTION OF THE PREFERRED EMBODIMENT

Now, the present invention will be described in greater detail by referring to the accompanying drawings that illustrate an optical disc recording/reproduction apparatus realized by applying the present invention.

Figure 1:
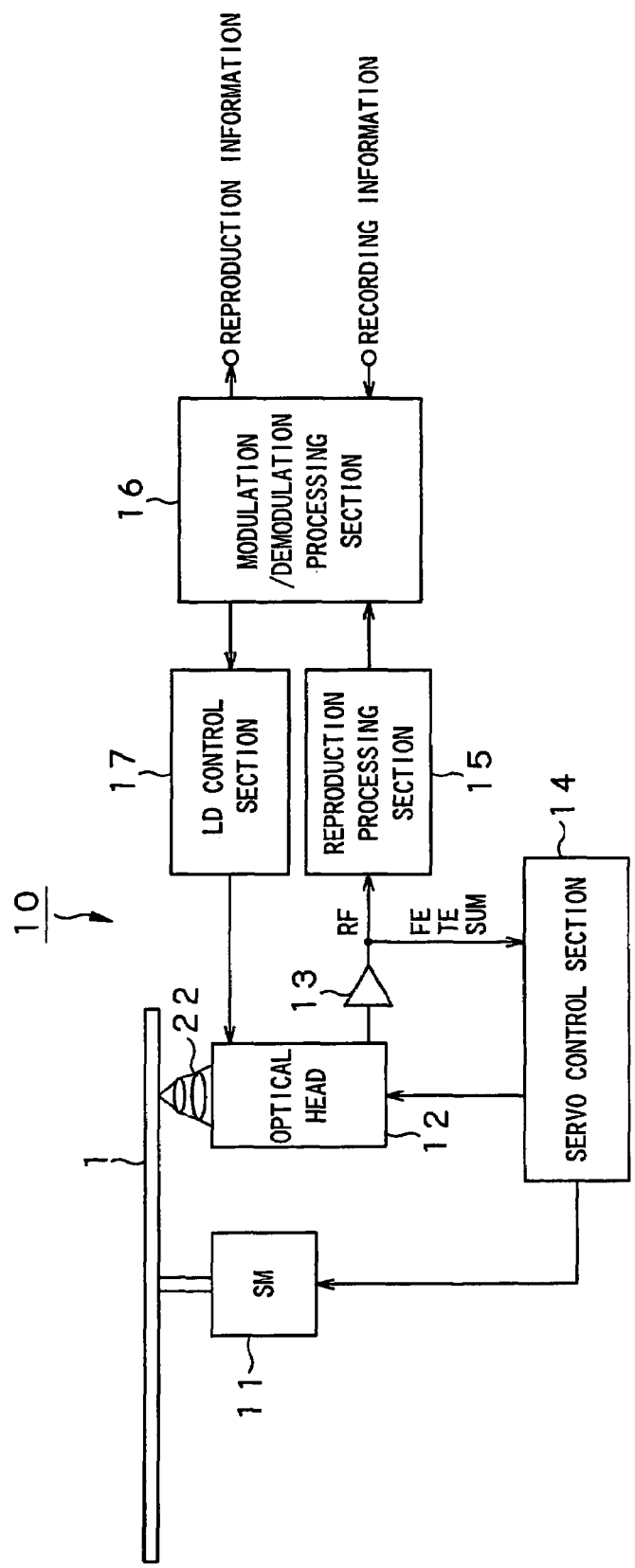
FIG. 1 is a schematic block diagram of an optical disc recording/reproduction apparatus realized by applying the present invention.

FIG. 1 is a schematic block diagram of an optical disc recording/reproduction apparatus 10 realized by applying the present invention.

The optical disc recording/reproduction apparatus 10 is a recording/reproduction apparatus to be used with a write-once type optical disc 1 that has reproduction compatibility with a BD (Blue-ray Disc (tradename)) for recording/reproducing information by means of a blue-violet semiconductor laser beam source (GaN laser diode) with a wavelength of 405 nm.

The write-once type optical disc 1 has an information recording layer that contains an organic coloring material. The information recording layer gives rise to an irreversible change to the light reflecting condition thereof when irradiated with light whose wavelength is 405 nm and whose power is not lower than a predetermined level. More specifically, when such light is irradiated with not less than a predetermined power level, the organic coloring material is destroyed and its reflectivity changed from the original level. The write-once type optical disc 1 is a recording medium that utilizes such changes in the light reflecting condition thereof to record information. Since the parts of the organic coloring material that have been destroyed would never restore the original condition, the write-once type optical disc 1 can record information only irreversibly (only once).

The write-once type optical disc 1 carries thereon a spiral track extending from the center toward the outer periphery of the disc. Information is recorded along the track. More specifically, as the laser beam is irradiated onto the disc with its power level under control and the laser spot on the disc is moved at a constant linear speed (or a constant angular speed) along the track, a row of parts where the light reflecting condition has changed by the irradiation of laser beam with not less than a predetermined power level (recording marks) and parts where the original light reflecting condition is maintained (spaces) are formed on the track according to the input recording signal (binary signal). Thus, the row of the recording marks and the spaces formed on the track is detected and the recorded information (binary signal) is reproduced when a laser beam is emitted with a power level lower than the predetermined power level and the laser spot on the disc is moved along the track so as to detect the light reflected by the track.

(Overall Configuration)

FIG. 1 is a schematic block diagram of the optical disc recording/reproduction apparatus 10, showing the overall configuration thereof. Referring to FIG. 1, the optical disc recording/reproduction apparatus 10 comprises a spindle motor 11 for driving a write-once type optical disc 1 to revolve, an optical head 12 for irradiating a laser beam onto the write-once type optical disc 1 and detecting the light reflected from the latter, a head amplifier 13 adapted to generate a reproduction signal from the quantity of the reflected light as detected by the optical head 12, servo error signals and so on and a servo control section 14 that performs various servo control operations. The optical disc recording/reproduction apparatus 10 further comprises a reproduction processing section 15 adapted to generate reproduction data of a digital data string (binary signal) by carrying out operations of waveform equalizing and binarization processing on the reproduction signal output from the head amplifier 13, a modulation/demodulation processing section 16 adapted to carry out a 1-7PP demodulation processing operation on the reproduction data output from the reproduction processing section 15 and a 1-7PP modulation processing operation on the externally input recording information in order to generate recording data and an LD control section 17 adapted to control the operation of driving the laser diode according to the recording data (binary signal) output from the modulation/demodulation processing section 16.

Figure 2:
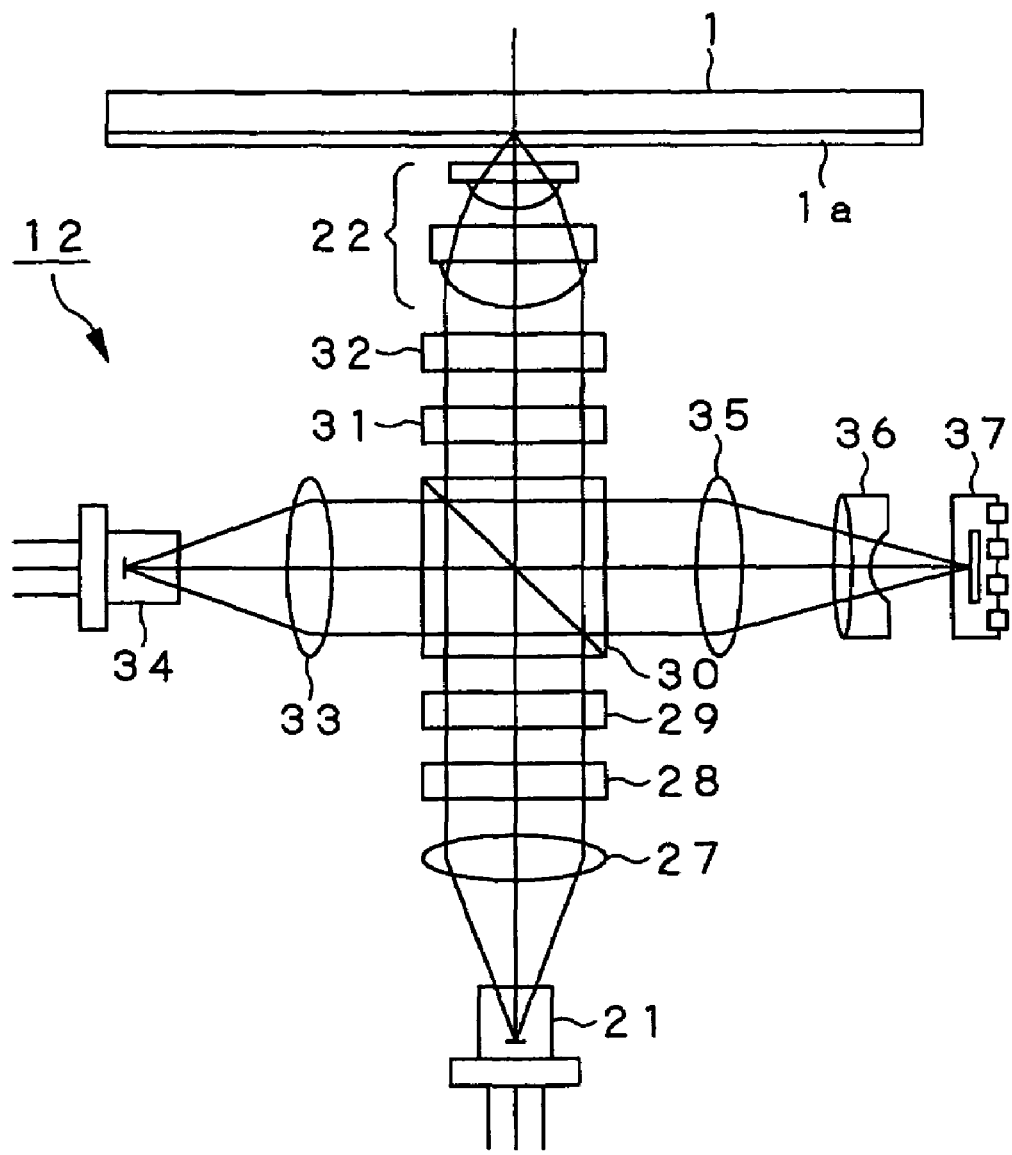
FIG. 2 is a schematic illustration of the optical head of the apparatus of FIG. 1.
Figure 3:
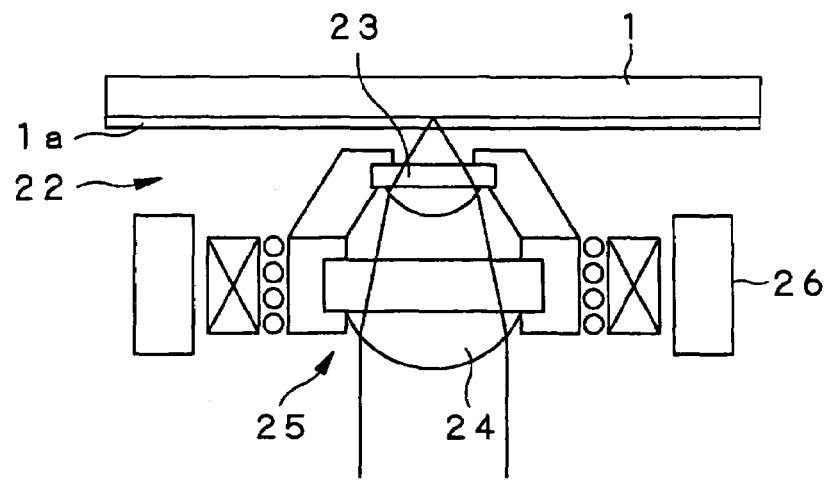
FIG. 3 is a schematic illustration of the 2-group objective lens that the optical head of FIG. 2 comprises.

FIG. 2 is a schematic illustration of the optical head 12 and FIG. 3 is a schematic illustration of the 2-group objective lens that the optical head 12 comprises.

The optical head 12 has a semiconductor laser 21 adapted to oscillate and generate a laser beam with a wavelength of 405 nm and a 2-group objective lens 22. The flow rate of the drive current to the semiconductor laser 21 is regulated by the drive control operation of the LD control section 17 in such a way that a write strategy of irradiating a single pulse beam for forming a recording mark having a length of (2×T), or irradiating a pulse beam for n/2 or (n−1)/2 times for forming a recording mark having a length of n×T (2T pulse recording system) is adopted for pulse beam irradiation. The operation of the LD control section 17 for controlling the semiconductor laser 21 will be described in greater detail hereinafter.

As shown in FIG. 3, the 2-group objective lens 22 includes a first lens 23 arranged at the side of the write-once type optical disc 1, a second lens 24 arranged in such a way that its optical axis agrees with the optical axis of the lens 23, a lens holder 25 for holding the first lens 23 and the second lens 24 and a biaxial electromagnetic actuator 26 adapted to support the lens holder 25 and move it both in the direction of the optical axis and in a direction perpendicular to the track of the write-once type optical disc 1. The numerical aperture of the first lens 23 and the second lens 24, when put together to operate as a single lens, is equal to 0.85.

The laser beam emitted from the semiconductor laser 21 is converted onto the write-once type optical disc 1 as it passes through the two lenses of the first lens 23 and the second lens 24. Since the 2-group objective lens 22 has a high numerical aperture of 0.85, the moving distance of the objective lens is relatively small if compared with conventional optical pickups and, in this embodiment, equal to about 140 μm. Generally, the tolerance to inclination of disc is reduced in optical disc devices when the numerical aperture is raised. The cover layer 1a of the write-once type optical disc 1 is made as small as about 0.1 mm in order to secure for the optical disc recording/reproduction apparatus 10 a tolerance to inclination of disc that is as large as that of DVD reproduction devices.

As shown in FIG. 2, the laser beam emitted from the semiconductor laser 21 is collimated by a collimator lens 27 and made to sequentially pass through a ½ wavelength plate 28, a diffraction grating 29 for generating a side spot to be used for computationally processing track control error signals, a polarization beam splitter 30, a liquid crystal element 31 and a ¼ wavelength plate 32 for converting a linearly polarized beam into a circularly polarized beam before it is converged onto the write-once type optical disc 1 by the 2-group objective lens 22. The laser beam emitted from the semiconductor laser 21 is partly reflected by the polarization beam splitter 30 and then led to an emission output detecting light receiving element 34 by a converging lens 33. The emission output detecting light receiving element 34 detects the intensity of incident light. Its detection output is supplied to the LD control section 17 so that the output of the semiconductor laser 21 is controlled to show a constant level by the LD control section 17.

The intensity of light striking the emission output detecting light receiving element 34 is regulated by the rotary angle of the ½ wavelength plate 28. The liquid crystal element 31 has a concentric pattern of electrodes and is adapted to generate an undulated surface that is substantially equivalent to the amount of compensation for the spherical aberration that is produced by the error in the thickness of the cover layer 1a. The voltages applied to the respective electrodes are controlled by the servo control section 14.

The beam reflected from the write-once type optical disc 1 is made to sequentially pass through the 2-group objective lens 22, the ¼ wavelength plate 32 for converting a linearly polarized beam into a circularly polarized beam and the liquid crystal element 31 before it is reflected by the polarization beam splitter 30. Then, it is made to pass through a converging lens 35 and a multi-lens 36 and then led to a light receiving element 37 for signal detection, which is a photoelectric conversion element.

Figure 4:
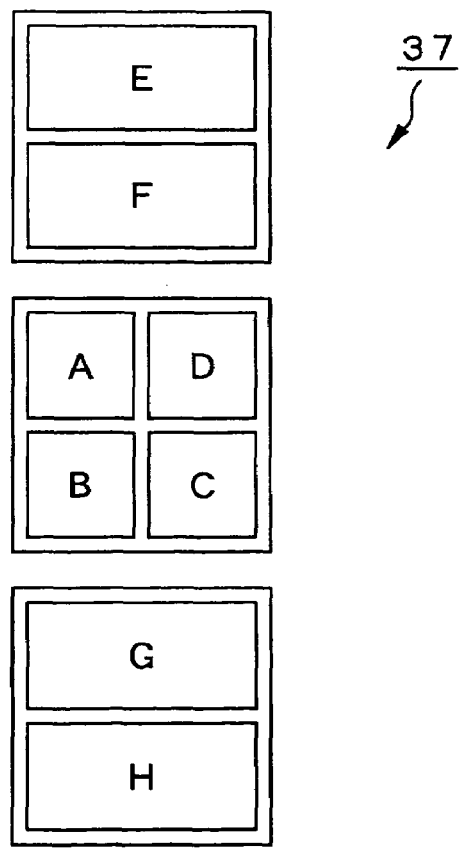
FIG. 4 is a schematic illustration of signal detecting light receiving elements that can be used for the optical head of FIG. 2.

In this embodiment, an astigmatism method and a differential push-pull method are used respectively as focusing error signal detection method and tracking error signal detection method. The light receiving element 37 for signal detection is an element that is divided into eight photo detectors A through H as shown in FIG. 4.

The focusing error signal (FE) and the tracking error signal (TE) are computationally detected respectively by means of formulas (2) and (3) shown below on the basis of the outputs of the photo detectors A through H.

$$FE=(A+C)-(B+D) \tag{2}$$

$$TE=(A+D)-(B+C)-k\{(E-F)+(G-H)\} \tag{3}$$

k in the formula (3) is a coefficient. Both reproduction signal (RF) and sum signal (SUM) are the sum of the photo detectors A through D and are given by formula (4) below. Note that all the band components of the reproduction signal (RF) are utilized whereas only low band components of the sum signal (SUM) are utilized.

$$RF=SUM=A+B+C+D \tag{4}$$

All the above cited arithmetic operations are performed by the head amplifier 13. The servo control operation of the servo control section 14 is based on these signals.

The servo control section 14 normalizes the focusing error signal (FE) and the tracking error signal (TE) by means of the sum signal (SUM) and generates a control signal by operating for gain adjustment and phase adjustment on the normalized signal. Then, it drives the biaxial electromagnetic actuator 26 in the optical head 12 according to the control signal and controls the 2-group objective lens 22 for focusing control and tracking control. The servo control section 14 also controls the spindle motor 11 for revolutions, the semiconductor laser 21 for the purpose of stabilizing the output power level thereof and the liquid crystal element 31 in the optical head 12 for operation.

The optical disc recording/reproduction apparatus 10 having the above described configuration operates in a manner as described below for signal reproduction and signal recording.

For signal reproduction, the power of the laser beam emitted from the semiconductor laser 21 is held to the reproduction level and the servo control section 14 performs various servo control operations necessary for the signal reproducing operation. The reproduction signal (RF) output from the head amplifier 13 is supplied to the reproduction processing section 15. The reproduction processing section 15 carries out operations of waveform equalization and binarization on the reproduction signal (RF) so as to reproduce and output the reproduced data string (binary signal) recorded on the write-once type optical disc 1. The data string output from the reproduction processing section 15 is input to the modulation/demodulation processing section 16. Then, the modulation/demodulation processing section 16 demodulates the input data string in a manner matching to the modulation method (1-7PP modulation) conforming to the BD Standards and outputs the demodulated digital information to an external apparatus.

For signal recording, the recording information to be recorded on the write-once type optical disc 1 is input from an external apparatus to the modulation/demodulation processing section 16. The modulation/demodulation processing section 16 modulates the input signal in a manner matching to the modulation method (1-7PP modulation) conforming to the BD Standards and supplies the obtained write data string (binary signal) to the LD control section 17. The write data string (binary signal) is input to the LD control section 17 along with its channel clock and the semiconductor laser 21 is driven and controlled according to the write strategy adapted to the present invention in response to the write data string (binary signal). At this time, the servo control section 14 performs various servo control operations and the recording position on the write-once type optical disc 1 is controlled (addressing control) so that the information is recorded on the write-once type optical disc 1 at the position that shows the predetermined address.

(LD Control Section)

Now, the internal configuration of the LD control section 17 will be described in greater detail below.

The write signal that is input to the LD control section 17 includes an NRZI (Non Return-to-Zero Inverse) signal that is encoded by the 1-7PP modulation method and the clock (channel clock) of the write signal. The NRZI signal that is encoded by the 1-7PP modulation method is a signal having a continuous identical code length that is equal to 2×T at shortest and 9×T at longest, where T is the cycle of the channel clock.

Then, the LD control section 17 forms a recording mark having a length that corresponds to the time length of each part of the NRZI signal, which is encoded by the 1-7PP modulation method (to be referred to simply as 1-7PP modulated signal hereinafter), that is continuously held to HIGH and a space having a length that corresponds to the time length of each part of the 1-7PP modulated signal that is continuously held to LOW. For this purpose, the LD control section 17 controls the laser beam emission of the semiconductor laser 21 in such a way that the semiconductor laser 21 irradiates a laser pulse beam for each part of the input 1-77PP modulated signal that is continuously held to HIGH and reduces the emission of the laser beam to the bias level for each part of the input 1-77PP modulated signal that is continuously held to LOW.

Figure 5:
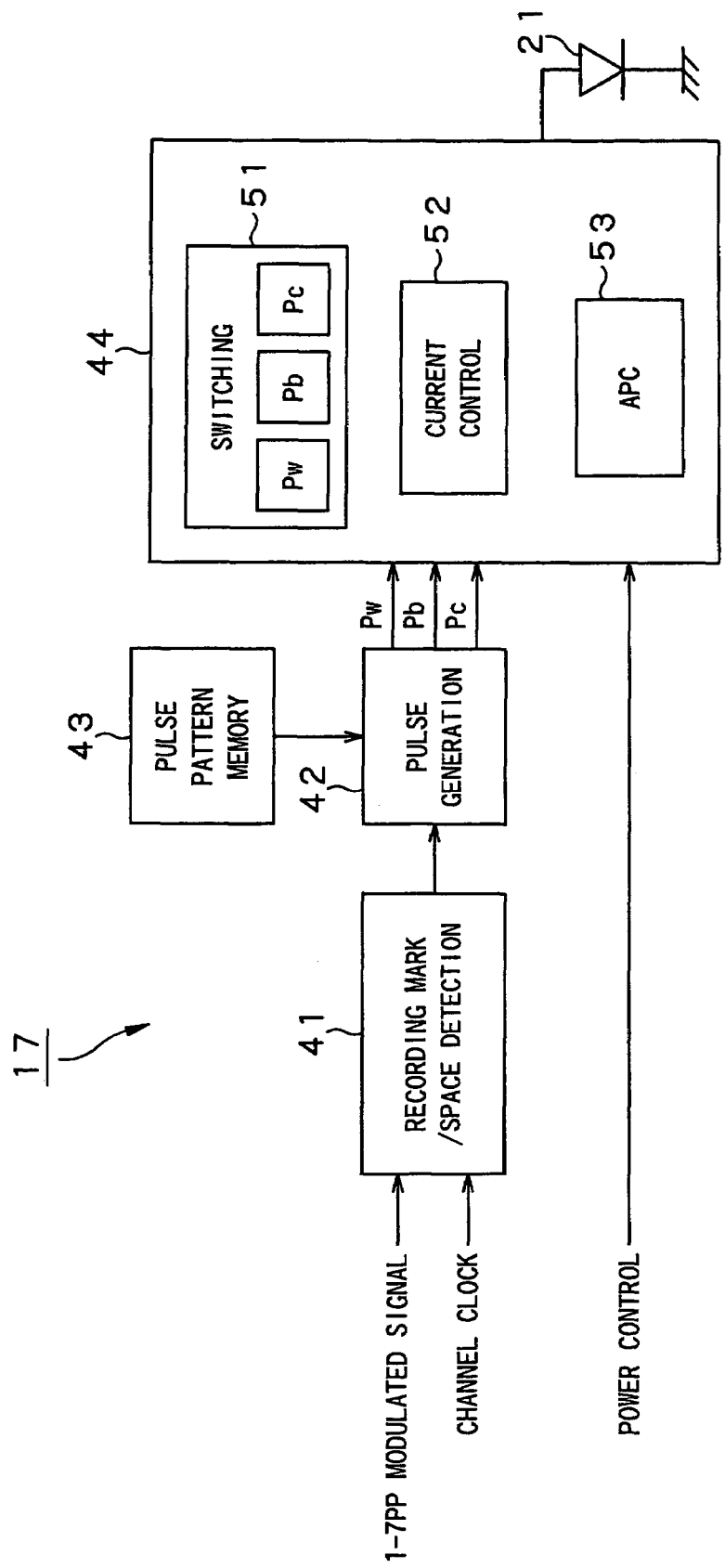
FIG. 5 is a schematic block diagram of the LD control section of the apparatus of FIG. 1.

FIG. 5 is a schematic block diagram of the LD control section 17, showing the internal configuration thereof.

As shown in FIG. 5, the LD control section 17 comprises a recording mark/space detecting section 41, a pulse generating section 42, a pulse pattern memory section 43 and a laser drive section 44.

The 1-7PP modulated signal and the channel clock are input to the recording mark/space detecting section 41. The recording mark/space detecting section 41 detects the time length of each HIGH part of the 1-7PP modulated signal and that of each LOW part of the 1-7PP modulated signal on the basis of the timing of the channel clock and computationally determines the recording mark length and the space length for the respective parts. Since the 1-7PP modulated signal is a binary signal and recording marks and spaces are arranged alternately without fail, the recording mark lengths and the space lengths that computationally determined are output alternately.

The pulse generating section 42 receives the recording mark lengths and the space lengths output from the recording mark/space detecting section 41 along with the timing of the channel clock. Then, the pulse generating section 42 reads out the pulse pattern information that corresponds to the recording mark length of each of the recording marks and the space lengths of the spaces arranged immediately before and after the recording mark from the pulse pattern memory section 43 and generates a drive signal for a pulse beam defined by the pulse pattern information.

The pattern memory section 43 stores waveform patterns of pulse groups (pulse pattern information) that are generated when recording marks are formed with regard to all combinations of the recording mark lengths (2T through 9T), the space lengths immediately before a recording mark and the space lengths immediately after a recording mark. The pulse pattern information is typically stored in a predetermined region on the write-once type optical disc 1 and read out and stored in the pattern memory section 43 when the write-once type optical disc 1 is mounted in the optical disc recording/reproduction apparatus 10.

The pulse generating section 42 generates a drive control signal for the semiconductor laser 21 so as to produce an emission pattern indicated in the pulse pattern information at the timing of forming a recording mark. It also generates a drive control signal for the semiconductor laser 21 so as to emit a beam of bias power at the timing of forming a space. In this embodiment, the semiconductor laser 21 is controlled for its drive power level by three values including a peak level (Pw) that is for recording power for forming a recording mark, a bias level (Pb) and a cooling level (Pc). Thus, the pulse generating section 42 outputs a signal Pw that indicates the peak level (Pw), a signal Pb that indicates the bias level (Pb) and a signal Pc that indicates the cooling level (Pc) in order to express the generated signal pattern.

The three signals (Pw, Pb, Pc) output from the pulse generating section 42 are input to the laser drive section 44. The laser drive section 44 has a switching circuit 51 for selecting one of the three levels (peak level, bias level, cooling level) for the flow rate of the electric current that is made to flow to the semiconductor laser 21 according to the above described three signals (Pw, Pb, Pc), an electric current control circuit 52 for controlling the electric current flow rate at each of the three levels (peak level, bias level, cooling level) and an APC (Automatic Power Control) circuit 53 for regulating the flow rate of the electric current flowing to the semiconductor laser 21 according to the feedback signal for stabilizing and controlling the laser power output from the servo control section 14. The laser drive section 44 having the above described configuration is adapted to drive the semiconductor laser 21 with the electric current flow rate corresponding to the pulse pattern generated by the pulse generating section 42 so as to have the semiconductor laser 21 irradiates a laser beam onto the write-once type optical disc 1.

(Write Strategy)

Now, the method of controlling the power of irradiating a laser beam for a data write operation (write strategy) will be described in greater detail below.

Figure 6:
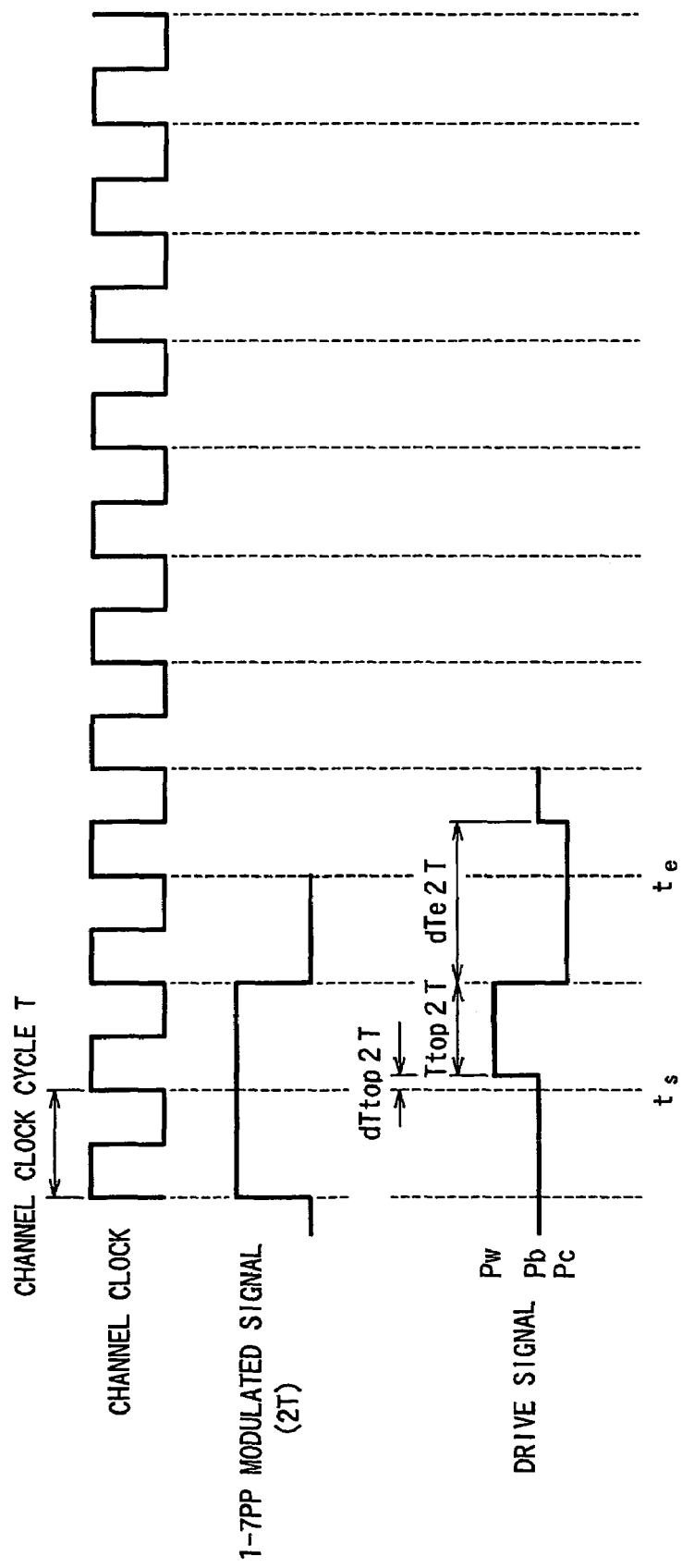
FIG. 6 is a schematic illustration of a drive signal that is applied to a semiconductor laser when forming a recording mark with a length of 2T.
Figure 7:
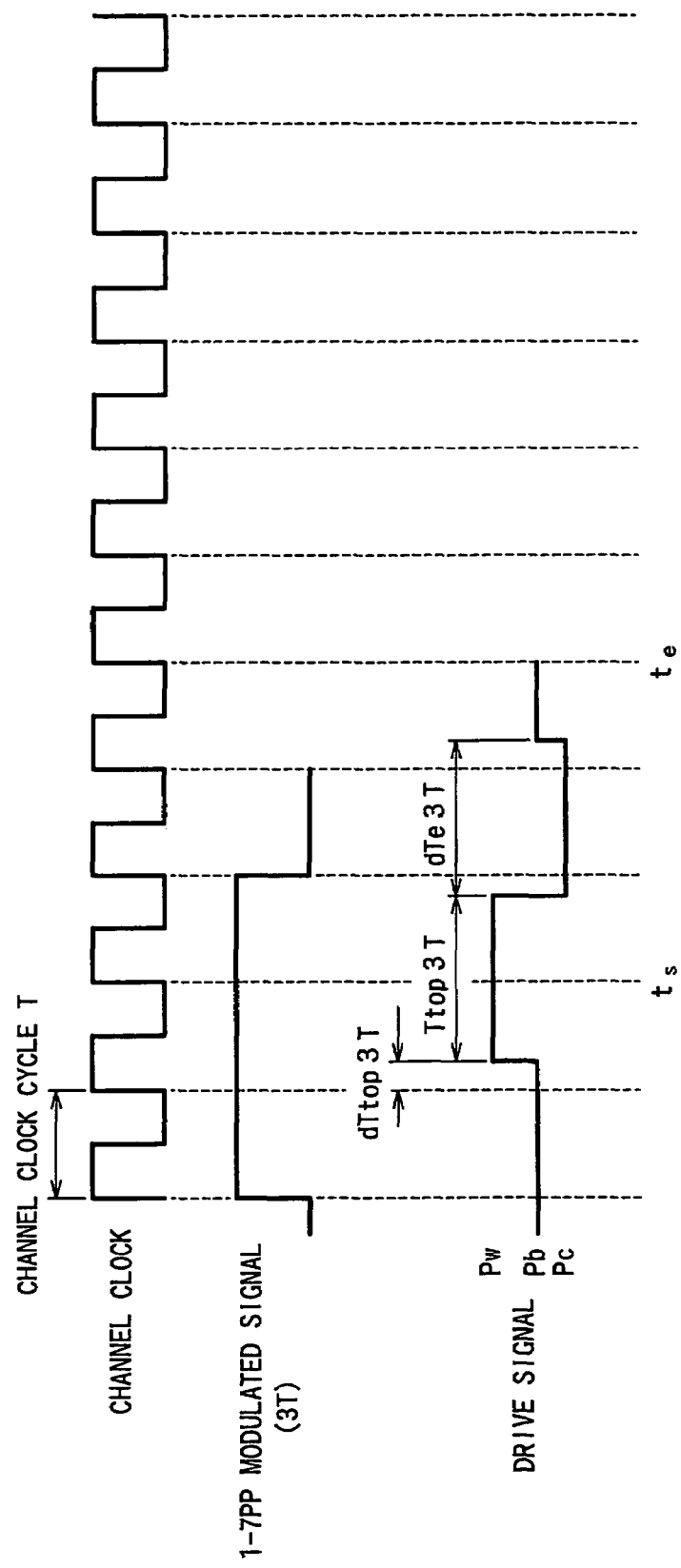
FIG. 7 is a schematic illustration of a drive signal that is applied to a semiconductor laser when forming a recording mark with a length of 3T.
Figure 8:
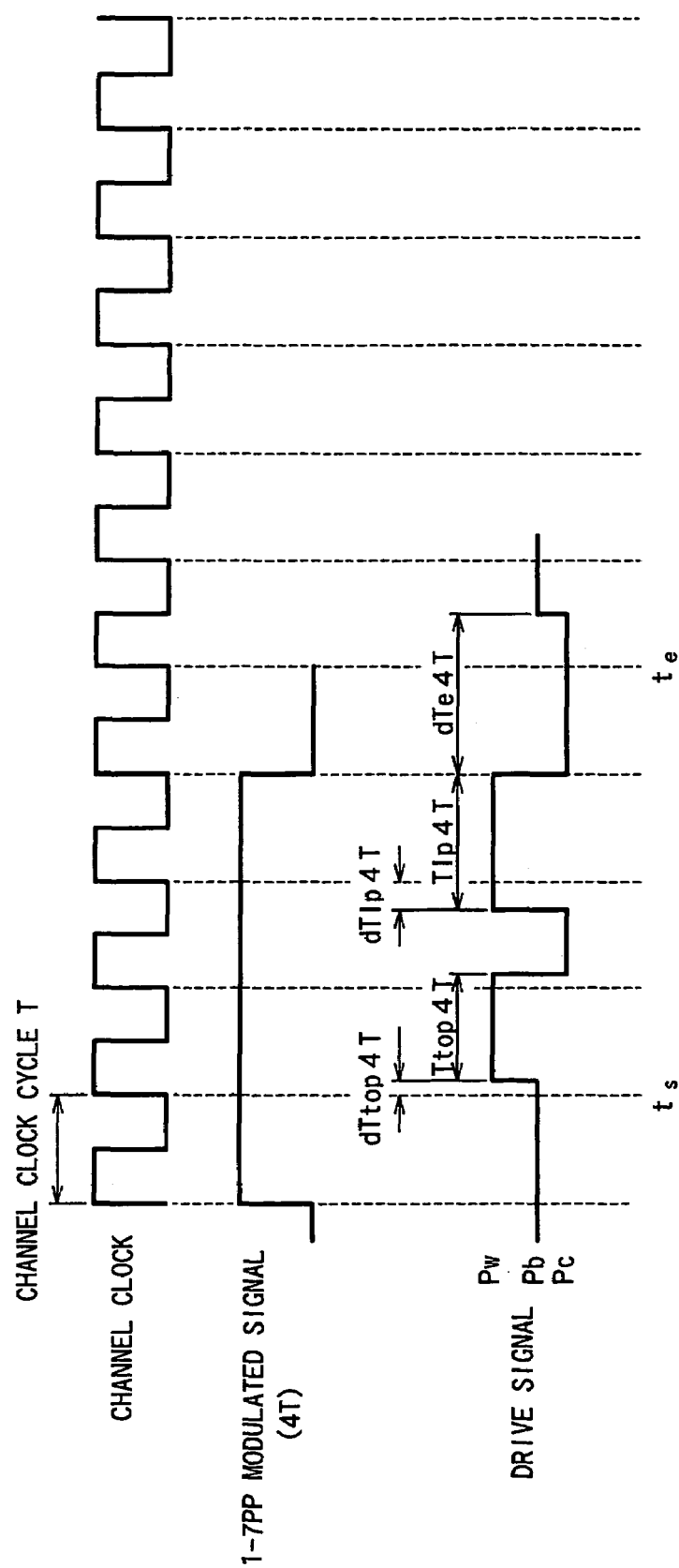
FIG. 8 is a schematic illustration of a drive signal that is applied to a semiconductor laser when forming a recording mark with a length of 4T.
Figure 9:
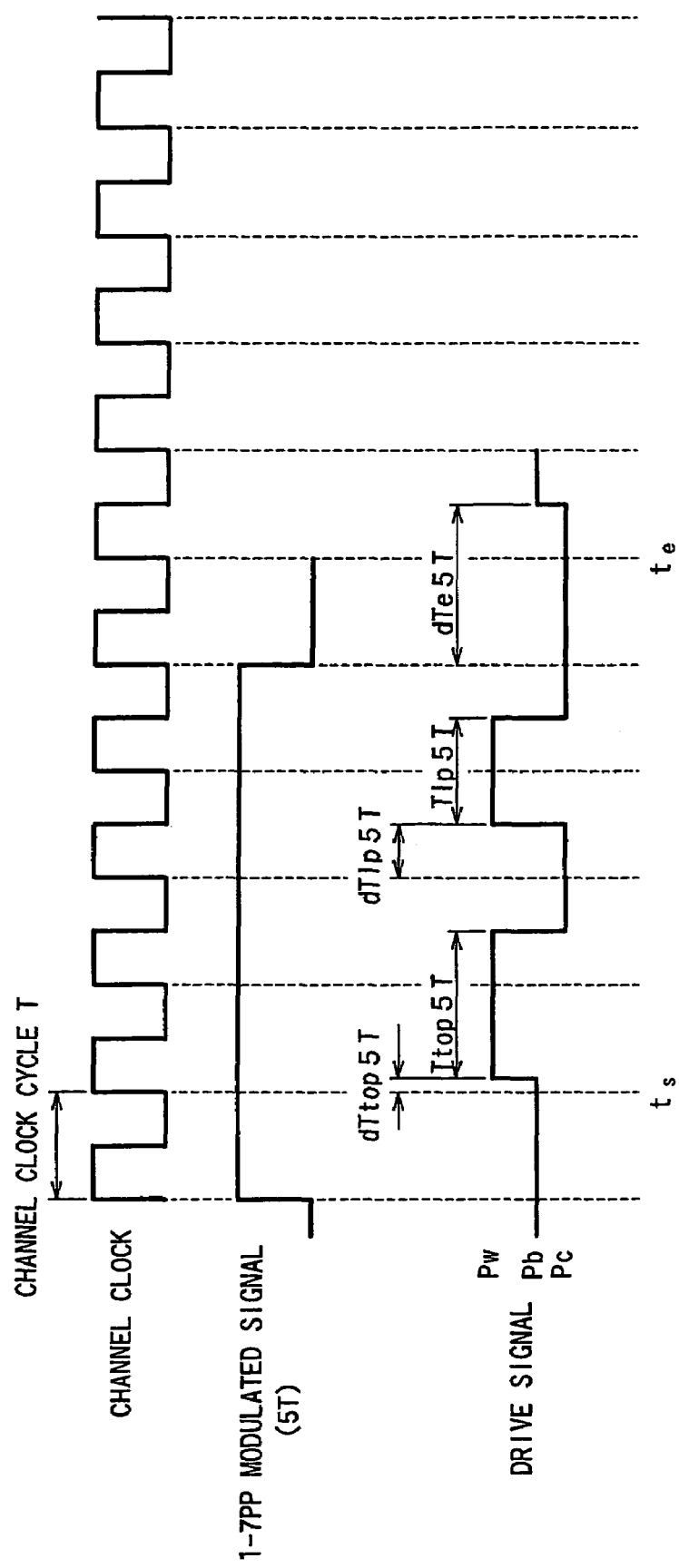
FIG. 9 is a schematic illustration of a drive signal that is applied to a semiconductor laser when forming a recording mark with a length of 5T.
Figure 10:
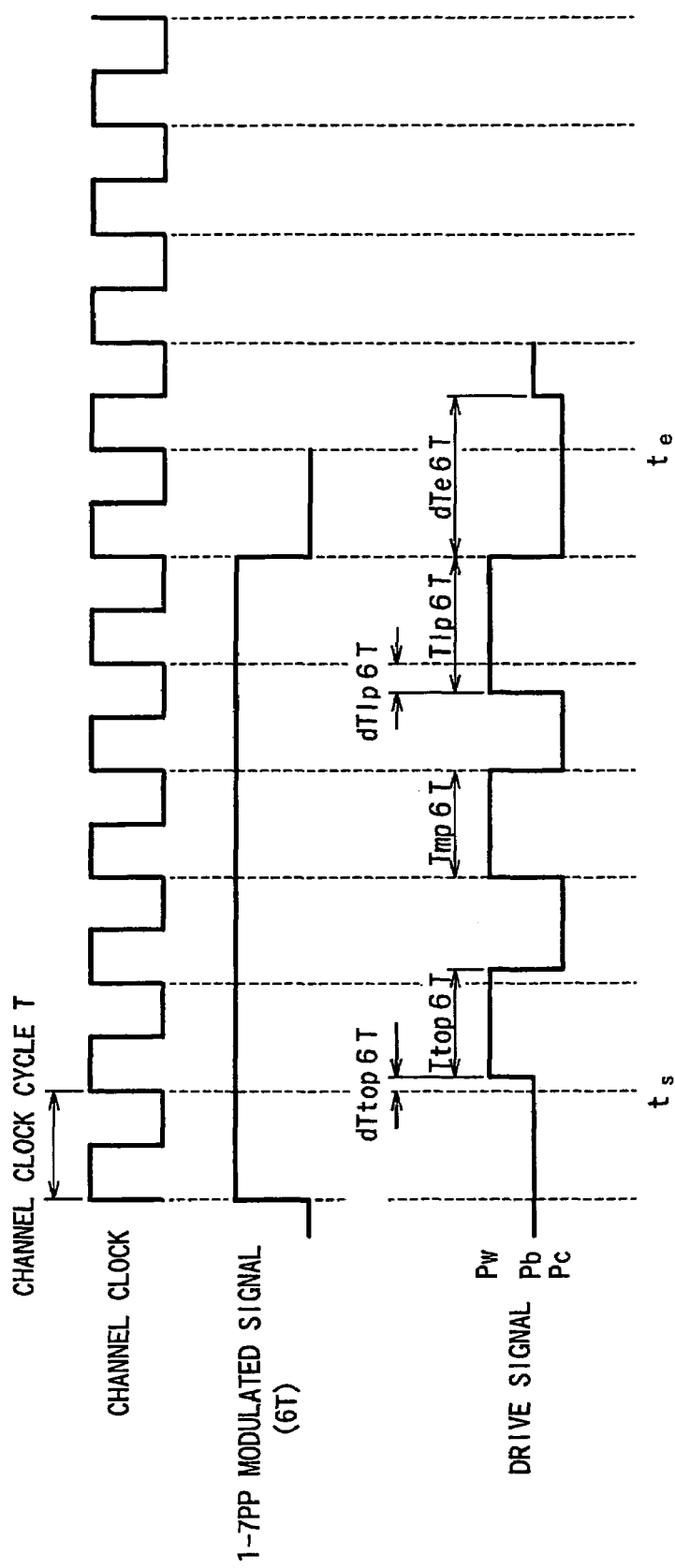
FIG. 10 is a schematic illustration of a drive signal that is applied to a semiconductor laser when forming a recording mark with a length of 6T.
Figure 11:
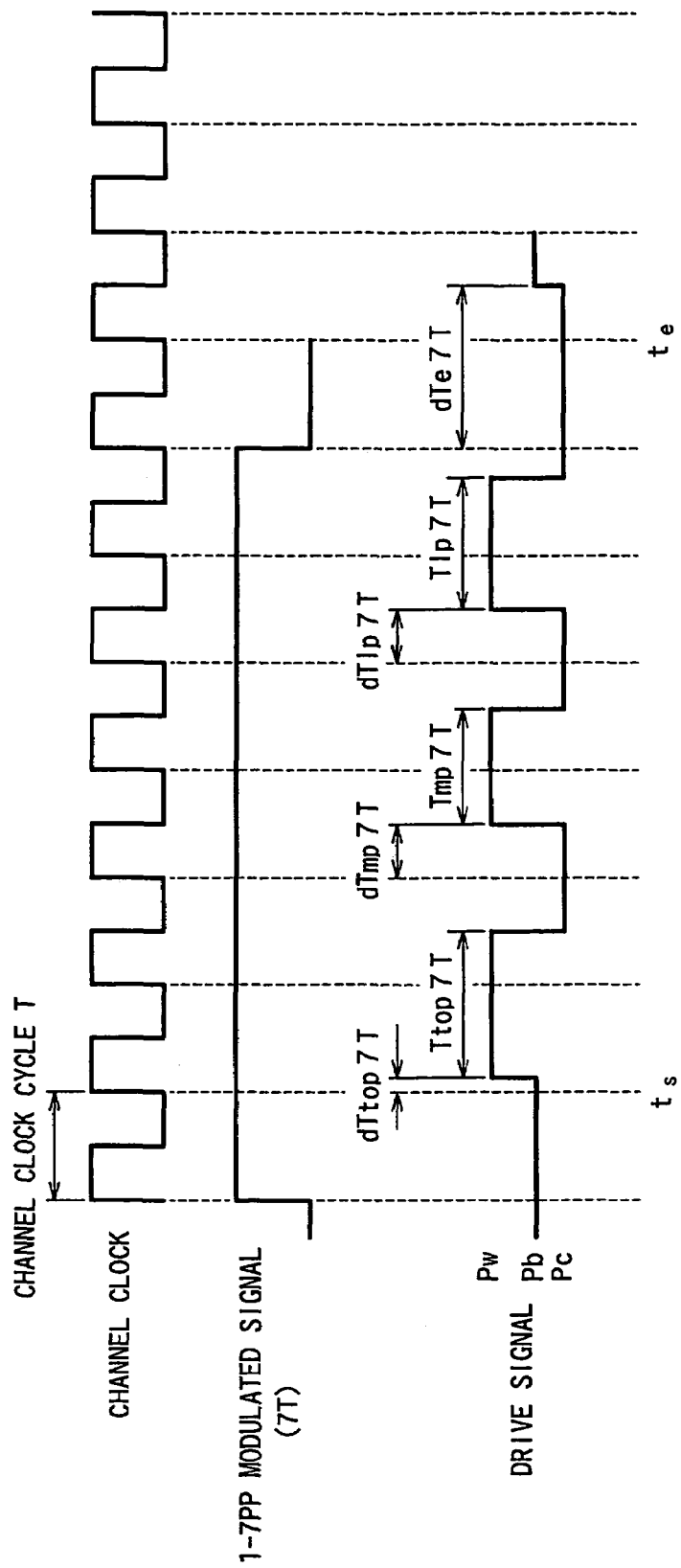
FIG. 11 is a schematic illustration of a drive signal that is applied to a semiconductor laser when forming a recording mark with a length of 7T.
Figure 12:
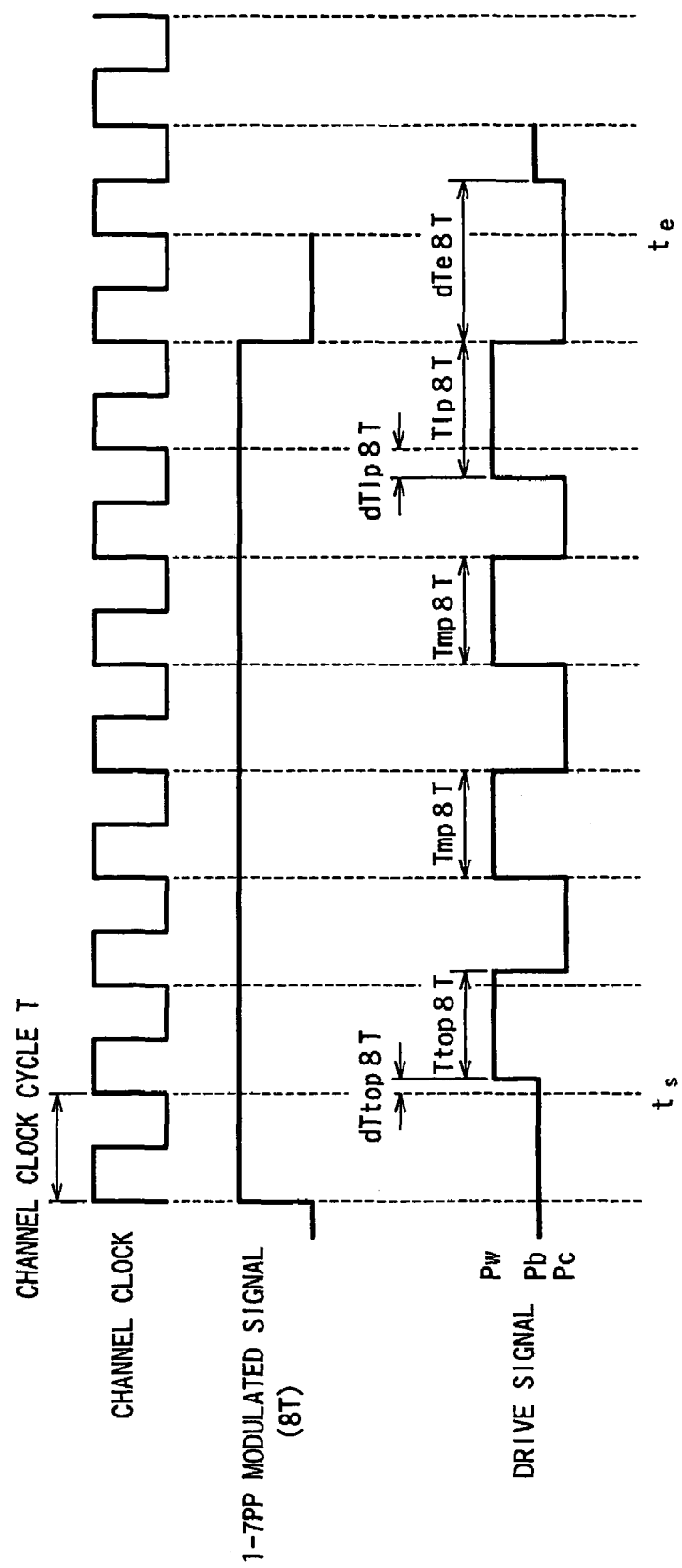
FIG. 12 is a schematic illustration of a drive signal that is applied to a semiconductor laser when forming a recording mark with a length of 8T.
Figure 13:
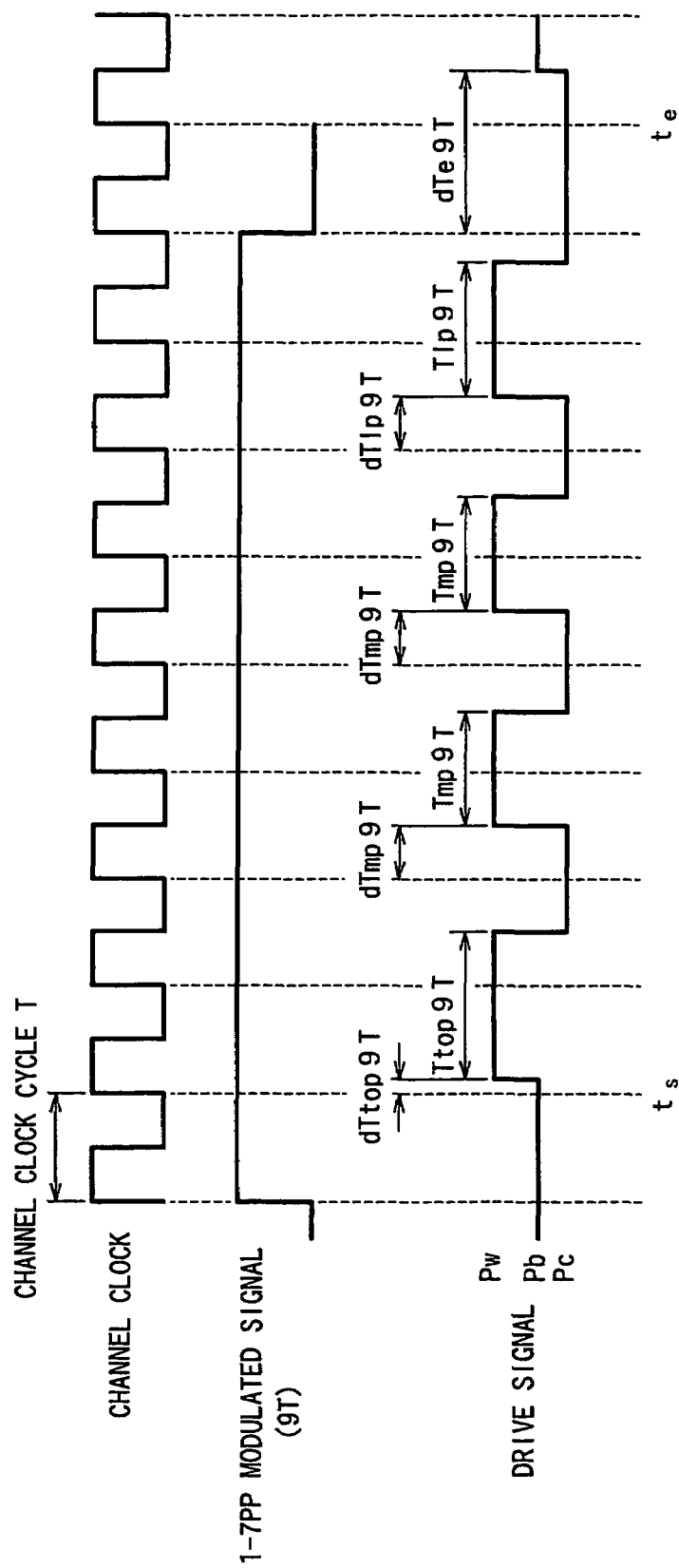
FIG. 13 is a schematic illustration of a drive signal that is applied to a semiconductor laser when forming a recording mark with a length of 9T.

FIGS. 6 through 12 schematically illustrate channel clocks, 1-7PP modulated signals (2T through 9T) and drive signals that are applied to a semiconductor laser 21 when forming recording marks with lengths that correspond to the respective signals. FIG. 6 is a schematic illustration of a drive signal for a pulse pattern of recording mark with a length of 2T (2T mark) and FIG. 7 is a schematic illustration of a drive signal for a pulse pattern of recording mark with a length of 3T (3T mark), while FIG. 8 is a schematic illustration of a drive signal for a pulse pattern of recording mark with a length of 4T (4T mark). FIG. 9 is a schematic illustration of a drive signal for a pulse pattern of recording mark with a length of 5T (5T mark) and FIG. 10 is a schematic illustration of a drive signal for a pulse pattern of recording mark with a length of 6T (6T mark). Similarly, FIG. 11 is a schematic illustration of a drive signal for a pulse pattern of recording mark with a length of 7T (7T mark) and FIG. 12 is a schematic illustration of a drive signal for a pulse pattern of recording mark with a length of 8T (8T mark), while FIG. 13 is a schematic illustration of a drive signal for a pulse pattern of recording mark with a length of 9T (9T mark).

The rules for forming recording marks with the above listed respective lengths will be described below.

(1) When forming a recording mark with a length of $n1 \times T$ ($n1$ being an integer not smaller than 2), a pulse beam of $n1/2$ pulses (decimals, if any, being to be rounded down) is emitted within a time length of $n1 \times T$.

More specifically, the optical disc recording/reproduction apparatus 10 forms a 2T mark and a 3T mark on the write-once type optical disc 1 by a single emission of a pulse beam and a 4T mark and a 5T mark on the write-once type optical disc 1 by two emissions of a pulse beam, whereas the optical disc recording/reproduction apparatus 10 forms a 6T mark and a 7T mark on the write-once type optical disc 1 by three emissions of a pulse beam and an 8T mark and a 9T mark on the write-once type optical disc 1 by four emissions of a pulse beam.

(2) Each pulse beam is emitted when a drive signal for the semiconductor laser 21 is held to a predetermined power level (peak level (Pw)) and subsequently lowered to a cooling level (Pc). To emit a pulse beam repeatedly for a plurality of times, the semiconductor laser 21 is driven by repeating the cycle of a peak level (Pw) and a cooling level (Pc).

Note that the peak level (Pw) is the drive level for emitting a pulse beam with power necessary for destroying the organic coloring material of the write-once type optical disc 1, whereas the cooling level (Pc) is the drive level for controlling the width of the recording mark and also controlling each recording mark length on a channel clock basis. On the other hand, the emission power level of the laser beam is held to the bias level (Pb) for spaces. In other words, the bias level (Pb) is the drive level for preheating when starting emission of a laser beam at the peak level (Pw). The bias level (Pb) is found between the peak level (Pw) and the cooling level (Pc).

(3) The timing of emission and the duration of each pulse beam are controlled by the time width during which the drive signal is held ON (the time width during which the pulse beam is held to the peak level) and the timing of the rising edge of the drive signal when the latter is made ON.

More specifically, the optical disc recording/reproduction apparatus 10 controls the timing of the rising edge of each pulse beam and hence the position of the pulse beam in a manner as described below.

Assume that a pulse beam is emitted for m times (m being a natural number not smaller than 1) for forming a recording mark having a certain length and that the timing of the rising edge of the 1-7PP modulated signal that corresponds to the recording mark is found at time TS. Note that the time TS comes at a timing that is synchronized with the channel clock.

The position of the leading pulse beam (rising edge) is controlled by means of the delay time from the time TS.

The position of the tail end pulse beam (m-th pulse beam) is controlled by means of the delay time from time $(TS+\{(m-1) \times 2 \times T\})$. No tail end pulse beam exists in the case of a 2T mark and a 3T mark because m=1.

In the case of a 6T or longer recording mark, one or more than one intermediate pulse beams other than the leading pulse beam and the tail end pulse beam will exist. For a 6T or longer recording mark, the position of the intermediate pulse beam or each of the intermediate pulse beams (the timing of the rising edge) is controlled in a manner as described below.

If the recording mark length is 6T or longer and equal to even number times of the channel clock (e.g., 6T, 8T), the emission of pulse beam is so controlled that the rising edge of the second pulse beam is synchronized with time $(TS+(2 \times T))$ and the rising edge of the third pulse beam is synchronized with time $(TS+(4 \times T))$, while the rising edge of the n2-th pulse beam (n2 being an integer not smaller than 2 and not greater than (m−1) is synchronized with time $(TS+\{(n2-1) \times 2 \times T\})$.

If, on the other hand, the recording mark length is 6T or longer and equal to odd number times of the channel clock (e.g., 7T, 9T), the emission of pulse beam is so controlled that the rising edge of the second pulse beam is synchronized with time $(TS+(T/2)+(2 \times T))$ and the rising edge of the third pulse beam is synchronized with time $(TS+(T/2)+(4 \times T))$, while the rising edge of the n2-th pulse beam (n2 being an integer not smaller than 2 and not greater than (m−1) is synchronized with time $(TS+(T/2)+\{(n2-1) \times 2 \times T\})$.

In other words, if the recording mark length is 6T or longer and equal to even number times of the channel clock, the optical disc recording/reproduction apparatus 10 makes the intermediate pulse beam or each of the intermediate pulse beams start to be emitted at a timing synchronized with the phase of the channel clock. If, on the other hand, the recording mark length is 6T or longer and equal to odd number times of the channel clock, the optical disc recording/reproduction apparatus 10 makes the intermediate pulse beam or each of the intermediate pulse beams start to be emitted at a timing delayed by ½ cycle relative to the phase of the channel clock.

With this control technique, the pulse beam irradiation intervals for forming a single recording mark are held uniform. Additionally, the emission control circuit can be made to show a simple configuration because the intermediate pulse beam or each of the intermediate pulse beams start to be emitted either at a timing synchronized with the phase of the channel clock or at a timing delayed by ½ cycle relative to the phase of the channel clock.

Additionally, the optical disc recording/reproduction apparatus 10 separately controls the timing of the end of the cooling period that comes after the tail end pulse beam.

More specifically, if the timing of the rising edge of the 1-7PP modulated signal that corresponds to the recording mark is equal to time Te, the timing of the end of the cooling period that comes after the tail end pulse beam is controlled by the delay time from time T.

(4) In the optical disc recording/reproduction apparatus 10, the pattern memory section 43 stores the timing of the rising edge of the leading pulse, that of the rising edge of the tail end pulse, the ON time period of each pulse and the cooling time after the tail end pulse as pulse pattern information for all combinations of the recording mark lengths (2T through 9T), the space lengths immediately before a recording mark and the space lengths immediately after a recording mark in a state where the related parameters are regulated. Therefore, it is possible to accurately control the edges of the recording marks formed on the write-once type optical disc 1. Thus, it is possible to improve the tolerance for the positional displacement of the pulse beam and errors of the length of the pulse beam and reduce the recording power level of the laser beam.

Specific examples of the parameters stored in the pattern memory section 43 include the delay time of the leading pulse (dTtop9T), the ON time period of the leading pulse (Ttop9T), the delay time of the intermediate pulse(s) (dTmp9T), the ON time period of the intermediate pulse(s) (Tmp9T), the delay time of the tail end pulse (Tlp9T), the ON time period of the tail end pulse (Tlp9T) and the cooling time after the tail end pulse (dTe9T), all of which are expressed as numerical values.

With the BD (Blu-ray Disc) system, the channel clock frequency is defined to be equal to 66 MHz for the standard recording rate. This rate corresponds to the data transfer rate of about 36 Mbps. Additionally, the rates (tr, tf) that are achieved when a blue-violet semiconductor laser (GaN) is driven as light source are limited to about 2 ns. Therefore, with the standard recording rate, the time length that corresponds to 1T is about 15.2 ns so that it is possible to continuously emit a pulse beam with a time width of T/2 (which corresponds to 7.6 ns) to form a recording mark.

However, for double rate (2×) recording, the channel clock frequency is as high as 132 MHz so that the time length that corresponds to T/2 is about 3.8 ns and hence a high speed drive circuit is required. Furthermore, for quadruple rate (4×) recording, the time length that corresponds to T/2 is about 1.9 ns so that it is practically not possible to emit a pulse beam with a time width of T/2.

Therefore, the optical disc recording/reproduction apparatus 10 is effective to realize a high transfer rate recording that is double to quadruple relative to the standard recording rate of the write-once type optical disc 1 defined for the BD (Blu-ray Disc) system. More specifically, it is effective when it is applied to recording with a channel clock cycle T of less than 10 ns.

Additionally, with the BD system, a capacity of 25 GB is realized for an optical disc having a diameter of 120 mm by using a laser beam source of a wavelength of 405 nm and an objective lens with a numerical aperture of 0.85. With the specifications of the D system, the length of a physical recording mark that corresponds to 1T on the recording medium is as small as about 75 µm. Therefore, a disc of the BD system is apt to be influenced by the history of heat irradiation that takes place when forming preceding and succeeding recording marks if compared with discs of conventional systems such as CDs and DVDs. On the other hand, the optical disc recording/reproduction apparatus 10 controls the pulse beam so as to flexibly change the pulse beam emission spot depending on the space length between two consecutive recording marks. Still additionally, in the case of a write-once type recording medium that contains an organic coloring material as principal ingredient, it is possible to temporally uniformly arrange the positions of irradiated pulse if compared with a rewritable recording medium formed by using a phase change recording material so that it is possible to optimally control the position of the front edge, that of the tail end edge and the width of the recording mark to be formed.

Figure 14A:
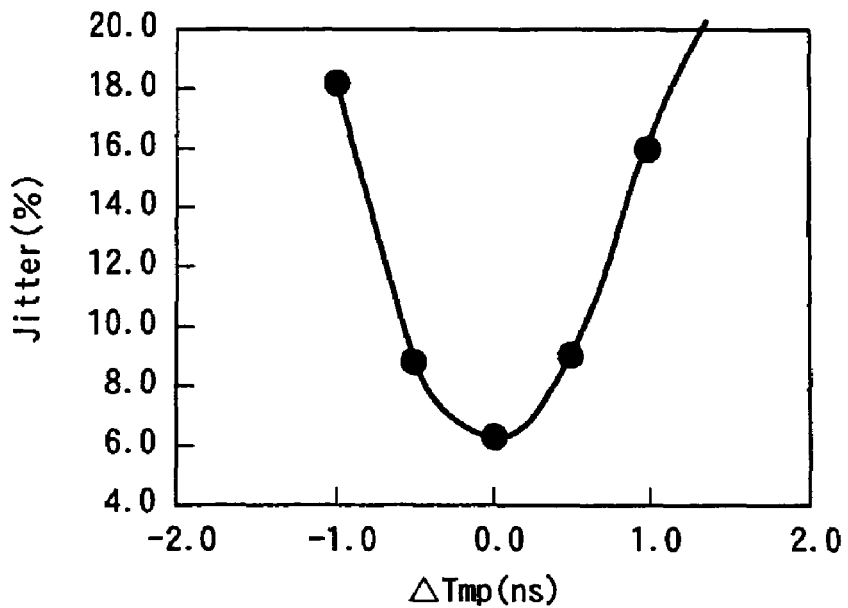
FIG. 14A and FIG. 14B are schematic illustrations of the tolerance relative to displacement of pulse beam when double speed recording is applied to a write-once type recording medium containing an organic coloring material as principal ingredient in the optical disc recording/reproduction apparatus of FIG. 1 and the tolerance relative to displacement of pulse beam of the (n−1) times pulse irradiation scheme, which is the conventional pulse irradiation scheme.
Figure 14B:
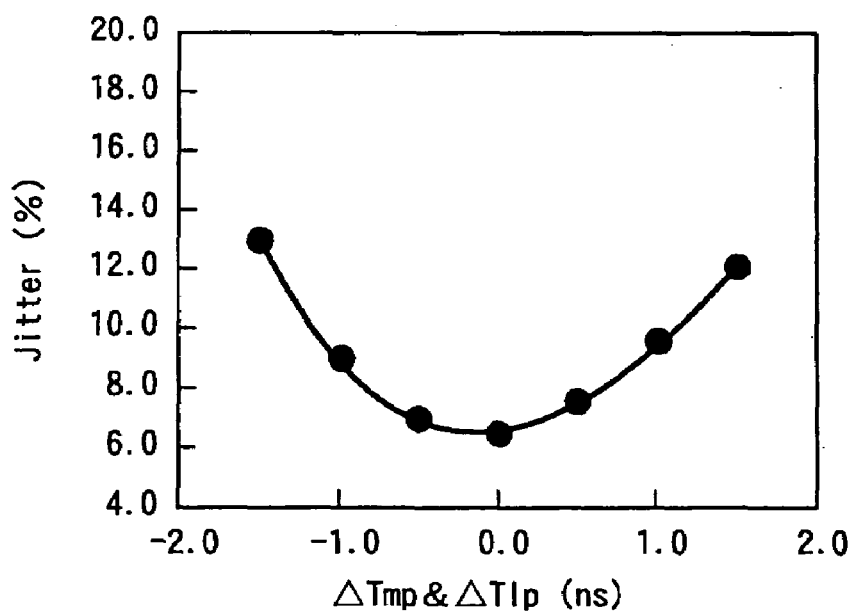
Figure 15:
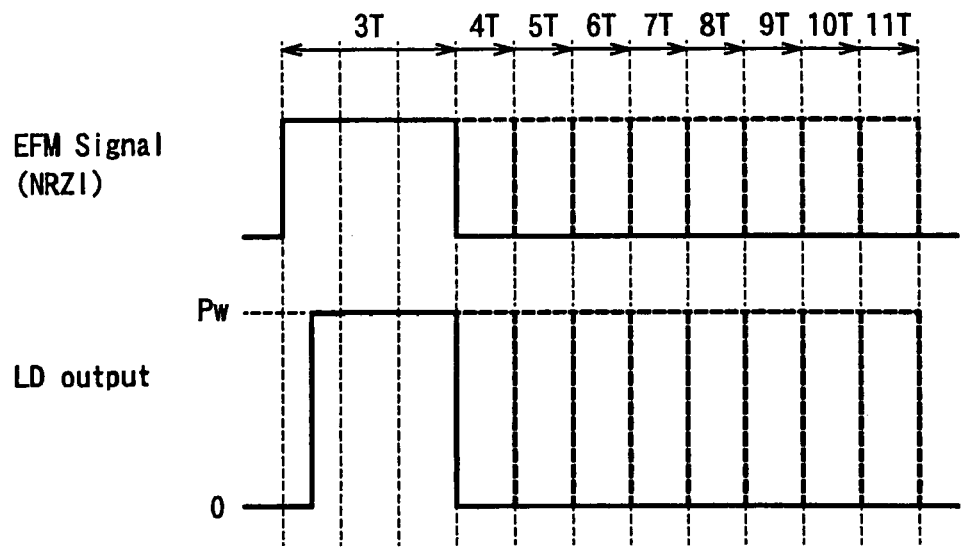
FIG. 15 is a schematic illustration of a write strategy for forming a recording mark by continuously irradiating a laser beam.
Figure 16:
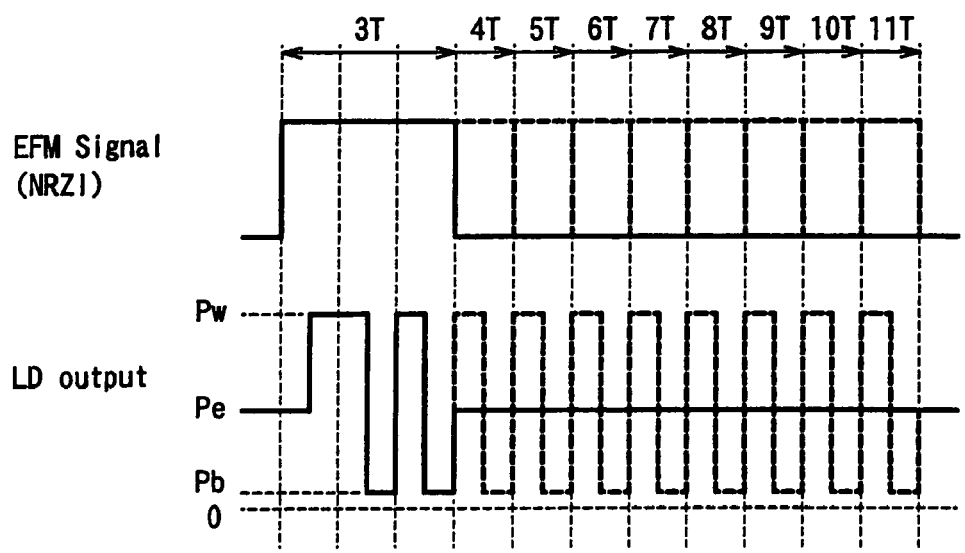
FIG. 16 is a schematic illustration of a write strategy for forming a recording mark by irradiating a pulse beam for one or a plurality of times.

FIG. 14A and FIG. 14B are schematic illustrations of the tolerance relative to displacement of pulse beam when double speed recording is applied to a write-once type recording medium containing an organic coloring material as principal ingredient in the optical disc recording/reproduction apparatus 10 and the tolerance relative to displacement of pulse beam of the (n−1) times pulse irradiation scheme, which is the conventional pulse irradiation scheme.

FIG. 14A is graph showing the jitters of a reproduced signal observed after recording a signal, while uniformly changing the pulse width of the intermediate pulse or each of the intermediate pulses and that of the tail end pulse in ± directions from the optimum value in the (n−1) times pulse irradiation scheme (by numerically expressing the statistic values ($\sigma$) of the mark edge positions as displacements from the synchronous clock). On the other hand, FIG. 14B is a graph showing the result of observation obtained when conducting a similar recording/reproducing operation, using the n/2 times pulse irradiation recording method of the optical disc recording/reproduction apparatus 10 of this embodiment.

As clearly seen from FIG. 14A and FIG. 14B, the optical disc recording/reproduction apparatus 10 of this embodiment can realize a broader tolerance if compared with the conventional system.

Furthermore, with the n/2 times pulse irradiation recording method of this embodiment, it is possible to select a peak power (Pw) level for recording that is lower than the peak power level of the conventional (n−1) times pulse irradiation scheme. In other words, the recording method of the present invention is effectively under high speed recording conditions that require a high output power level for the semiconductor laser.

While the present invention is applied to a recording/reproduction apparatus to be used with a write-once type optical disc 1 that has reproduction compatibility with a BD (Blu-ray Disc) and contains an organic coloring material as principal ingredient in the above described embodiment, the present invention is by no means limited thereto and may also be applicable to recording devices of other types that use a blue-violet semiconductor laser as light source as well as to optical information recording devices that use a red semiconductor laser or an infrared semiconductor laser as light source. The present invention is also applicable to write-once type recording mediums whose recording layer contains a metal material as principal ingredient. Additionally, a recording pulse irradiation method according to the invention is applicable not only to write-once type recording mediums but also to rewritable type recording mediums in order to realize an excellent recording/reproduction performance under high transfer rate conditions. Then, it is possible to improve the tolerance for displacement of pulse beam and errors in the length of the pulse beam in order to allow the recording power level of the laser beam to be reduced.

What is claimed is:

1. An information recording device for writing binary data on a write-once type information recording medium having a recording material that gives rise to an irreversible change to the light reflecting condition thereof when irradiated with light of not less than a predetermined power level by forming a continuous row of recording marks, which are parts where the light reflecting condition has changed, and spaces, which are parts where the light reflecting condition has not changed, the device comprising:
- a modulation section adapted to generate the binary data to be written onto the write-once type information recording medium by modulating the input information;
- a laser write section adapted to irradiate a laser beam onto the write-once type information recording medium, moving the position of the laser beam irradiation spot relative to the write-once type information recording medium; and
- a control section adapted to control the laser write section according to the binary data and forming a row of recording marks and spaces corresponding to the code string of the binary data;
- the modulation section being so adapted that, if the channel clock cycle of the binary data is T, it modulates the input information such that the shortest identical code length of the binary data is not less than 2×T;
- the control section being so adapted that
- when forming a recording mark having a length of n1×T, n1 being an integer not smaller than 2, a pulse beam is irradiated onto the write-once type information recording medium for n1/2 times, decimals, if any, being to be rounded down, and,
- when forming a recording mark having a length of not smaller than n2×T, n2 being an even number not smaller than 6, a pulse beam is irradiated onto the write-once type information recording medium for n2/2 times with all the intermediate pulse beams synchronized with the phase of the channel clock except the leading pulse beam and the tail end pulse beam, whereas,
- when forming a recording mark having a length of not smaller than n3×T, n3 being an odd number not smaller than 6, a pulse beam is irradiated onto the write-once type information recording medium for (n3−1)/2 times with all the intermediate pulse beams delayed from the phase of the channel clock by T/2 except the leading pulse beam and the tail end pulse beam.

2. A device according to claim 1, wherein the control section changes the emission time of the pulse beam, the cooling time after the emission, the position of the leading pulse beam and that of the tail end pulse beam as a function of the length of the space immediately before and that of the space immediately after any recording mark.

3. A device according to claim 1, wherein the modulation section generates an NRZI signal that is encoded by the 1-7PP modulation method.

4. A device according to claim 1, wherein the channel clock cycle T of the binary data is less than 10 ns.

5. A device according to claim 1, wherein the laser beam emitted from the laser write section has a wavelength not longer than 415 nm.

6. An information recording method for writing binary data on a write-once type information recording medium having a recording material that gives rise to an irreversible change to the light reflecting condition thereof when irradiated with light of not less than a predetermined power level by forming a continuous row of recording marks, which are parts where the light reflecting condition has changed, and spaces, which are parts where the light reflecting condition has not changed, the method comprising:
- generating the binary data to be written onto the write-once type information recording medium by modulating the input information; and
- irradiating a laser beam onto the write-once type information recording medium, moving the position of the laser beam irradiation spot relative to the write-once type information recording medium, to form a row of recording marks and spaces corresponding to the code string of the binary data;
- the information recording method being so adapted that,
- if the channel clock cycle of the binary data is T, it modulates the input information such that the shortest identical code length of the binary data is not less than 2×T; and that,
- when forming a recording mark having a length of n1×T, n1 being an integer not smaller than 2, a pulse beam is irradiated onto the write-once type information recording medium for n1/2 times, decimals, if any, being to be rounded down and,
- when forming a recording mark having a length of not smaller than n2×T, n2 being an even number not smaller than 6, a pulse beam is irradiated onto the write-once type information recording medium for n2/2 times with all the intermediate pulse beams synchronized with the phase of the channel clock except the leading pulse beam and the tail end pulse beam, whereas,
- when forming a recording mark having a length of not smaller than n3×T, n3 being an odd number not smaller than 6, a pulse beam is irradiated onto the write-once type information recording medium for (n3−1)/2 times with all the intermediate pulse beams delayed from the phase of the channel clock by T/2 except the leading pulse beam and the tail end pulse beam.

7. A method according to claim 6, further comprising
a step of changing the emission time of the pulse beam, the cooling time after the emission, the position of the leading pulse beam and that of the tail end pulse beam as a function of the length of the space immediately before and that of the space immediately after any recording mark.

8. A method according to claim 6, wherein an NRZI signal that is encoded by the 1-7PP modulation method is generated in the modulation step.

9. A method according to claim 6, wherein the channel clock cycle T of the binary data is less than 10 ns.

10. A method according to claim 6, wherein the laser beam emitted from the laser write section has a wavelength not longer than 415 nm.

* * * * *

UNITED STATES PATENT AND TRADEMARK OFFICE
CERTIFICATE OF CORRECTION

PATENT NO.        : 7,301,875 B2　　　　　　　　　　　　　　　　　　　　　　Page 1 of 1
APPLICATION NO. : 10/890176
DATED             : November 27, 2007
INVENTOR(S)       : Isao Ichimura et al.

It is certified that error appears in the above-identified patent and that said Letters Patent is hereby corrected as shown below:

Column 13, line 53, change "D system" to -- BD system --

Signed and Sealed this

Twenty-ninth Day of September, 2009

David J. Kappos
*Director of the United States Patent and Trademark Office*